United States Patent
Kim et al.

(10) Patent No.: US 10,903,520 B2
(45) Date of Patent: Jan. 26, 2021

(54) MULTI-LAYER STRUCTURE POLYMER SOLID ELECTROLYLTE AND ALL SOLID-STATE BATTERY COMPRISING THE SAME

(71) Applicant: LG CHEM, LTD., Seoul (KR)

(72) Inventors: Daeil Kim, Daejeon (KR); Jonghyun Chae, Daejeon (KR); Yeonju Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 167 days.

(21) Appl. No.: 16/305,163

(22) PCT Filed: May 30, 2018

(86) PCT No.: PCT/KR2018/006146
§ 371 (c)(1),
(2) Date: Nov. 28, 2018

(87) PCT Pub. No.: WO2018/236064
PCT Pub. Date: Dec. 27, 2018

(65) Prior Publication Data
US 2020/0235427 A1 Jul. 23, 2020

(30) Foreign Application Priority Data
Jun. 20, 2017 (KR) .................. 10-2017-0077792
May 25, 2018 (KR) .................. 10-2018-0059591

(51) Int. Cl.
*H01M 4/131* (2010.01)
*H01M 4/60* (2006.01)
(Continued)

(52) U.S. Cl.
CPC ....... *H01M 10/0565* (2013.01); *H01M 4/131* (2013.01); *H01M 4/137* (2013.01);
(Continued)

(58) Field of Classification Search
CPC .......... H01M 4/131; H01M 4/60; H01M 4/62; H01M 4/137; H01M 10/0565
See application file for complete search history.

(56) References Cited

U.S. PATENT DOCUMENTS

2006/0014067 A1   1/2006   Hedhli et al.
2009/0169992 A1   7/2009   Ishiko et al.
(Continued)

FOREIGN PATENT DOCUMENTS

CN   101045806 A   10/2007
CN   104681865 A   6/2015
(Continued)

OTHER PUBLICATIONS

European Search Report for Appl. No. 18811698.2 dated Jul. 26, 2019.
(Continued)

*Primary Examiner* — Kenneth J Douyette
(74) *Attorney, Agent, or Firm* — Birch, Stewart, Kolasch & Birch, LLP

(57) ABSTRACT

The present invention relates to a polymer electrolyte of a multi-layer structure and an all solid-state battery comprising the same, wherein the polymer electrolyte can exhibit an effect capable of stably operating in the high voltage positive electrode and in the low voltage negative electrode, when using the polymer solid electrolyte having a multi-layer structure, which includes the first polymer electrolyte layer and the second polymer electrolyte layer of the present invention, and the all solid-state battery containing it is applicable in the battery field of electric vehicle in which high capacity and high-power battery are used.

16 Claims, 4 Drawing Sheets

(51) Int. Cl.
- *H01M 10/0565* (2010.01)
- *H01M 4/137* (2010.01)
- *H01M 4/62* (2006.01)
- *H01M 10/0525* (2010.01)
- *H01M 10/0562* (2010.01)
- *H01M 4/02* (2006.01)

(52) U.S. Cl.
CPC ........... *H01M 4/608* (2013.01); *H01M 4/624* (2013.01); *H01M 10/0525* (2013.01); *H01M 10/0562* (2013.01); *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 2012/0094187 A1 | 4/2012 | Kwon et al. | |
| 2014/0106236 A1 | 4/2014 | Kwon et al. | |
| 2014/0255772 A1 | 9/2014 | Kyu et al. | |
| 2016/0064770 A1 | 3/2016 | Lee et al. | |
| 2016/0336625 A1 | 11/2016 | Jeong et al. | |
| 2017/0062829 A1* | 3/2017 | Ryu | H01M 4/628 |
| 2018/0123169 A1 | 5/2018 | Solan et al. | |
| 2018/0159169 A1 | 6/2018 | Ko et al. | |

FOREIGN PATENT DOCUMENTS

| | | |
|---|---|---|
| EP | 3 093 906 A1 | 11/2016 |
| FR | 3 040 550 A1 | 3/2017 |
| JP | 8-222235 A | 8/1996 |
| JP | 2003-331918 A | 11/2003 |
| JP | 3507926 B2 | 3/2004 |
| JP | 2007-207675 A | 8/2007 |
| JP | 2008-507087 A | 3/2008 |
| JP | 2014-523068 A | 9/2014 |
| JP | 2016-219411 A | 12/2016 |
| KR | 10-2003-0005254 A | 1/2003 |
| KR | 10-1311494 B1 | 9/2013 |
| KR | 10-2014-0089899 A | 7/2014 |
| KR | 10-2016-0013631 A | 2/2016 |
| KR | 10-2016-0026648 A | 3/2016 |
| KR | 10-2016-0077962 A | 7/2016 |
| KR | 10-2017-0051324 A | 5/2017 |
| WO | WO 02/061872 A1 | 8/2002 |
| WO | WO 2011/024837 A1 | 3/2011 |
| WO | WO 2017/032940 A1 | 3/2017 |

OTHER PUBLICATIONS

Alarco et al., "The plastic-crystalline phase of succinonitrile as a universal matrix for solid-state ionic conductors", Nature Materials, Jul. 2004, vol. 3, pp. 476-481.

Hu et al., "Progress in nitrile-based polymer electrolytes for high performance lithium batteries", Journal of Materials Chemistry A, 2016, vol. 4, pp. 10070-10083.

Minami et al., "Crystallization Process for Superionic $Li_7P_3S_{11}$ Glass—Ceramic Electrolytes", Journal of the American Ceramic Society, 2011, vol. 94, No. 6, pp. 1779-1783.

Zhou et al., "Plating a Dendrite-Free Lithium Anode with a Polymer/Ceramic/Polymer Sandwich Electrolyte"; Journal of the American Chemical Society, 2016, vol. 138, No. 30, pp. 9385-9388.

* cited by examiner

【Figure 1】
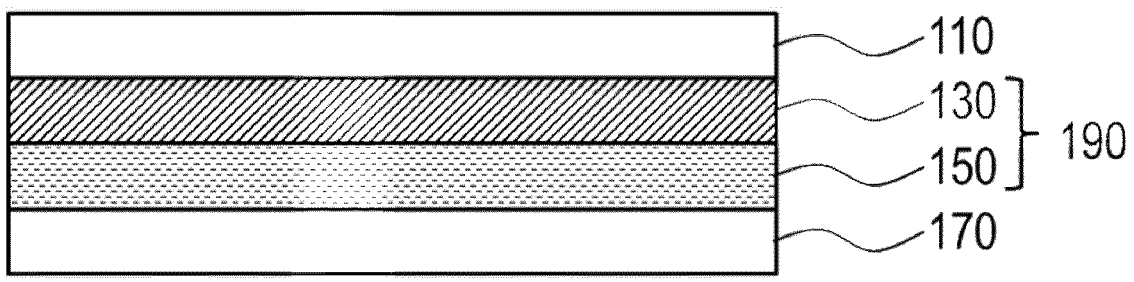
100

[Figure 2]
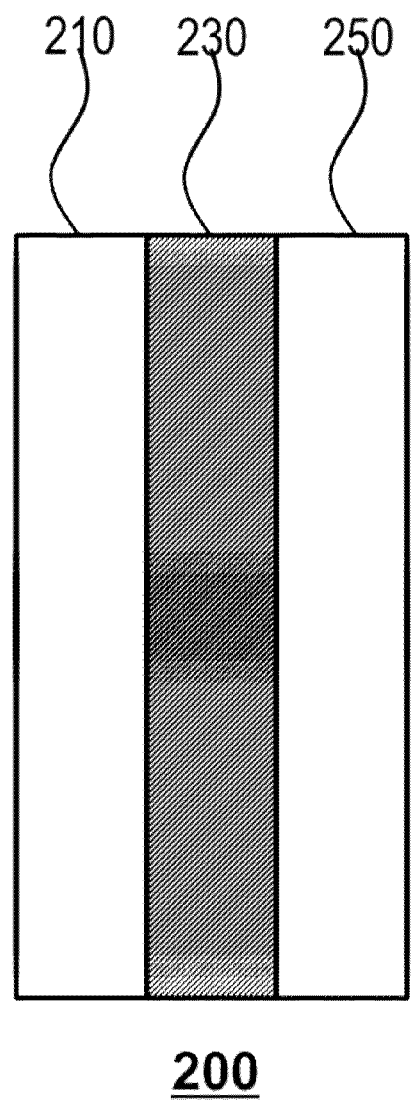
200

【Figure 3】
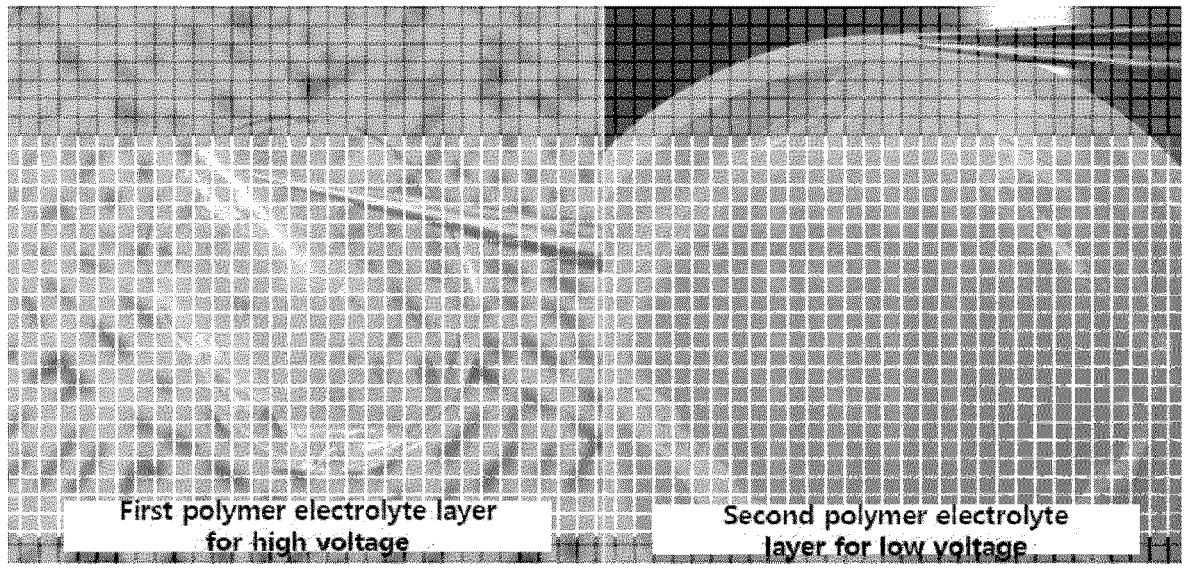
【Figure 4】
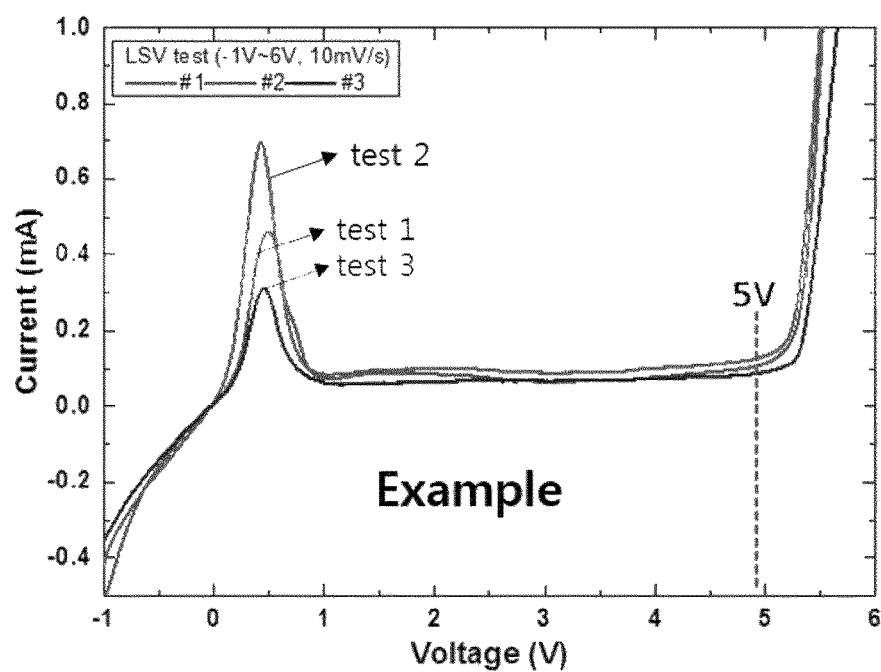

【Figure 5】
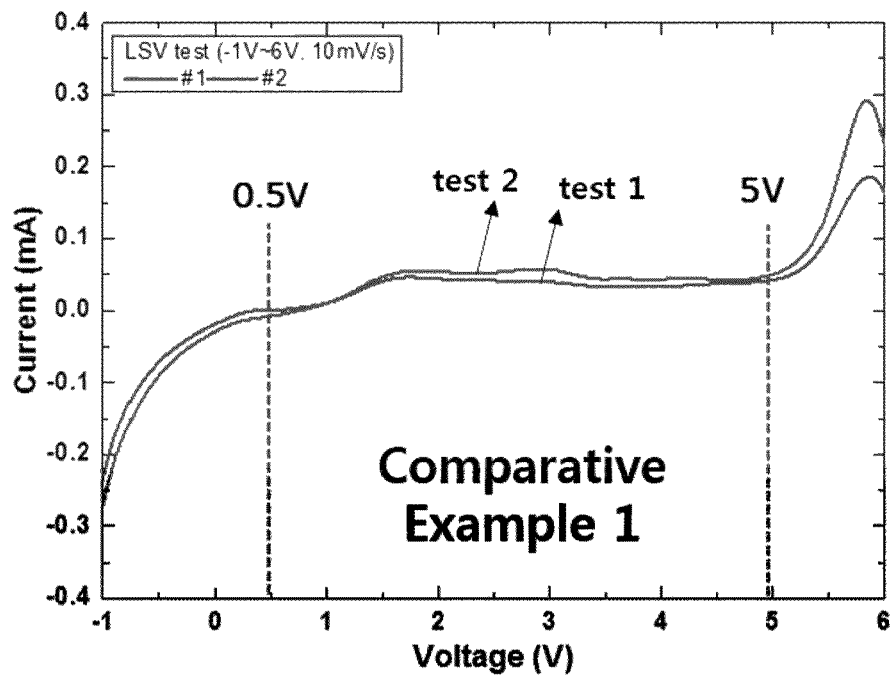
【Figure 6】
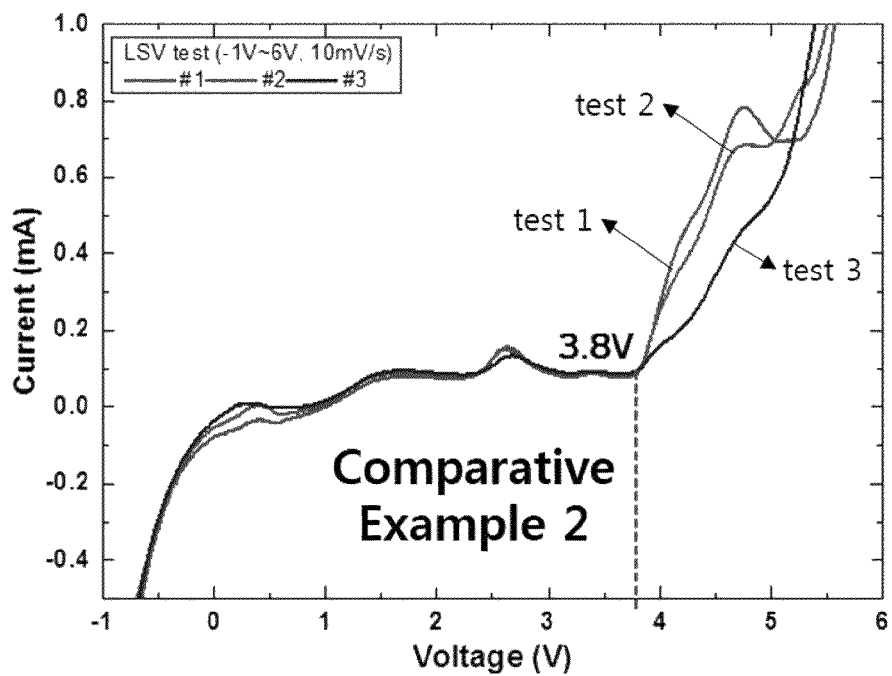

MULTI-LAYER STRUCTURE POLYMER SOLID ELECTROLYLTE AND ALL SOLID-STATE BATTERY COMPRISING THE SAME

TECHNICAL FIELD

The present application claims the benefit of Korean Patent Application No. 10-2017-0077792 filed on Jun. 20, 2017, and Korean Patent Application No. 10-2018-0059591 filed on May 25, 2018, all the contents of which are incorporated herein by reference.

The present invention relates to a multi-layer structure polymer solid electrolyte and an all solid-state battery comprising the same.

BACKGROUND ART

Lithium secondary batteries have been applied mainly to small-sized applications such as mobile devices and notebook computers, but in recent years, have been expanding their research into medium and large-sized fields and have been widely used in high-power applications mainly in relation to energy storage systems (ESSs), electric vehicles (EVs), etc.

In the case of lithium secondary batteries for such medium to large-sized fields, unlike small-sized fields, since the operating environment (e.g., temperature, shock) is not only severe, but also more batteries should be used, thus it is necessary to ensure safety along with an excellent performance or appropriate price.

Most of the currently commercialized lithium secondary batteries use an organic liquid electrolyte, in which lithium salts are dissolved in an organic solvent (flammable organic solvent), and thus has a potential risk of ignition and explosion, including leakage. In fact, since the explosion of products using these batteries is continuously reported, it is urgent to solve these problems.

If the safety device is used to solve these problems, there is a risk of loss of energy density due to the considerable weight of the safety device, and basically, due to the use of an organic liquid electrolyte, there is still a limit to overcome the safety problems.

Therefore, all solid-state batteries using solid electrolytes instead of the liquid electrolytic solution are under development. Because all solid-state batteries do not contain a flammable organic solvent, they have the advantage of being able to simplify the safety device and are therefore recognized as being superior batteries in terms of manufacturing cost and productivity. In addition, since it is easy to laminate a junction structure including a pair of electrode layers including a positive electrode cathode) layer and a negative electrode (anode) layer and a solid electrolyte layer interposed between the electrode layers in series, it is expected to be a technology capable of producing a high capacity and high-power battery with stability.

Existing solid electrolytes have been fabricated into a single solid polymer electrolyte film and have act as electrolyte and separator, and also have been applied/evaluated to lithium metal batteries using a lithium metal negative electrode or lithium ion batteries using a graphite negative electrode. However, it is difficult to realize a battery that operates simultaneously at the positive electrode in the high voltage region and at the negative electrode in the low voltage region at the same time as a polymer electrolyte. As an example, there arises a problem that the polymer electrolyte is oxidized at the surface of the positive electrode in the high voltage region or is reduced/decomposed on the surface of the negative electrode in the low voltage region, and also in the case of the single polymer electrolyte alone, there arises a problem that the interface resistance between the electrode and the electrolyte may increase due to the lack of the adhesion force.

In the case of a polymer electrolyte containing succinonitrile, since it has a high ion conductivity at room temperature of more than $10^{-4}$ S/cm and it operates stably at the positive electrode in high voltage region of 4V or more, but it has a disadvantage that the stability at the negative electrode in the low voltage region is weak, thus it is difficult to apply to Li metal and graphite negative electrode, and can be used only restrictively to LTO (Lithium Titanate) negative electrode with operating voltage of 1.5V. Meanwhile, polymer electrolytes based on PEO (Polyethylene Oxide) has good stability in the low voltage region and can operate on lithium negative electrode and graphite negative electrode, but on the other hand, have poor stability in high voltage regions and are difficult to apply to high voltage positive electrodes with 4V or more.

In order to solve various problems of the prior art mentioned above, a method has been proposed in which an inorganic solid electrolyte and a polymer electrolyte are fabricated into a multi-layer form. However, no study has been conducted on the multi-layer structure of polymer solid electrolytes stable in both the positive electrode in the high voltage region and the negative electrode in the low voltage region.

Therefore, it is required to develop a polymer solid electrolyte having a multi-layer structure capable of simultaneously and stably operating in a positive electrode in a high voltage region where positive electrode materials such as LCO (Lithium Cobalt Oxide) and LNMO ($LiNi_{0.5}Mn_{1.5}O_4$) can be used, and in a negative electrode in a low voltage region where negative electrode materials such as Li metal and graphite can be used,

PRIOR ART DOCUMENTS

Patent Documents (Patent Document 1) Japanese Patent Publication No. 2014-523068 (2014 Sep. 8), "New polymer electrolyte and lithium secondary battery containing same"; and
(Patent Document 2) Korean Patent Publication No. 2003-0005254 (2003 Jan. 17), "Polymer electrolyte having multi-layer structure, and lithium secondary battery comprising same."

Non-Patent Documents (Non-Patent Document 1) Weidong Zhou, Shaofei Wang, Yutao Li, Sen Xin, Arumugam Manthiram, and John B. Goodenough, Plating a Dendrite-Free Lithium Anode with a Polymer/Ceramic/Polymer Sandwich Electrolyte. J. Am. Chem. Soc. 2016, 138, 9385-9388; and
(Non-Patent Document 2) Pierre-Jean Alarco, Yaser Abu-Lebdeh, Ali Abouimrane and Michel Armand: The plastic-crystalline phase of succinonitrile as a universal matrix for solid-state ionic conductors, Nat. Mater. 2004, 4, 476-481.

DISCLOSURE

Technical Problem

Applicants of the present invention have conducted various studies in order to realize a battery that operates stably simultaneously in a positive electrode in a high voltage region and a negative electrode in a low voltage region and have confirmed that as a result of applying a solid electrolyte with a multi-layer structure, which has a different composition for each layer to enable operation over a wide range of operating voltages, to all solid-state batteries, such a solid electrolyte operates stably on the positive electrode in the high voltage region and on the negative electrode in the low voltage region, thereby completing the present invention.

It is an object of the present invention to provide a polymer electrolyte having a multi-layer structure for an all solid-state battery, which comprises a first polymer electrolyte layer and a second polymer electrolyte layer.

It is another object of the present invention to provide an all solid-state battery including the polymer electrolyte having the multi-layer structure.

Technical Solution

In order to achieve the above objects, the present invention provides a polymer electrolyte having a multi-layer structure for all solid-state batteries, which comprises a first polymer electrolyte layer including an aliphatic dinitrile compound represented by the following formula 1, a lithium salt and a lithium ion conductive polymer, and a second polymer electrolyte layer including an ionic liquid, a lithium salt and a lithium ion conductive polymer.

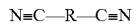  [Formula 1]

wherein R is $(CH_2)_n$ and n is an integer of 1 to 6.

At this time, the first polymer electrolyte layer comprises 20 to 50 parts by weight of the aliphatic dinitrile compound and 30 to 40 parts by weight of the lithium salt based on 100 parts by weight of the lithium ion conductive polymer.

In addition, the second polymer electrolyte layer comprises 20 to 50 parts by weight of the ionic liquid and 30 to 40 parts by weight of the lithium salt based on 100 parts by weight of the lithium ion conductive polymer.

In addition, the present invention provides an all solid-state battery comprising the polymer electrolyte having the multi-layer structure.

Advantageous Effects

When the polymer electrolyte having the multi-layer structure of the present invention is applied to an all solid-state battery, since there is no decomposition of the electrolyte on the positive electrode in the high voltage region, which is present in the liquid electrolyte, it can be applied to the positive electrode having high voltage of 4.0V or more. In addition, it can be applied without any side reaction and surface reaction on the negative electrode in the low voltage region of 1.5V or less, and also it can exhibit an effect capable of stably operating in the positive electrode in the high voltage region and in the negative electrode in the low voltage region.

Such an all solid-state battery is preferably applicable in the battery field of an electric vehicle using a high capacity and high-power battery.

DESCRIPTION OF DRAWINGS

FIG. 1 is a cross-sectional view of the all solid-state battery including the polymer electrolyte having the multi-layer structure.

FIG. 2 is a cross-sectional view of the all solid-state battery.

FIG. 3 is a photograph showing the first polymer electrolyte and the second polymer electrolyte.

FIG. 4 is a graph showing the voltage stability of the polymer electrolyte having the multi-layer structure.

FIG. 5 is a graph showing the voltage stability of Comparative Example 1.

FIG. 6 is a graph showing the voltage stability of Comparative Example 2.

BEST MODE

The present invention provides a polymer electrolyte having a multi-layer structure for all solid-state batteries, which comprises a first polymer electrolyte layer including an aliphatic dinitrile compound represented by the following formula 1, a lithium salt and a lithium ion conductive polymer, and a second polymer electrolyte layer including an ionic liquid, a lithium salt and a lithium ion conductive polymer.

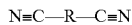  [Formula 1]

wherein R is $(CH_2)_n$ and n is an integer of 1 to 6.

In addition, the present invention provides a polymer electrolyte and an all solid-state battery comprising the same, wherein the polymer electrolyte consists of a multi-layer structure, and thus the polymer electrolyte that contacts the positive electrode in the all solid-state battery shows stable performance without decomposition in the high voltage region unlike the liquid electrolyte, and the polymer electrolyte that contacts the negative electrode can improve the property of not reducing and decomposing in a low voltage region close to 0V. Hereinafter, the present invention will be described in detail with reference to the drawings.

Polymer Electrolyte Having Multi-Layer Structure

FIG. 1 and FIG. 2 are cross-sectional views of the polymer electrolyte having the multi-layer structure for the all solid-state battery.

Referring to FIG. 1 and FIG. 2, the all solid-state batteries 100 and 200 has a structure including positive electrodes 110 and 210, negative electrodes 170 and 250, and a polymer electrolyte layer 130 and 150 interposed therebetween. At this time, the polymer electrolyte layer has a multi-layer structure and consists of the first polymer electrolyte layer 130 and the second polymer electrolyte layer 150 from the side in contact with the positive electrodes 110 and 210.

The all solid-state batteries 100 and 200 of the present invention implement an electrolyte having a multi-layer structure by using a polymer electrolyte, and thus the batteries that operates stably both in the positive electrode in the high voltage region and the negative electrode in the low voltage region, compared to a battery made of a conventional polymer electrolyte, are realized. The existing polymer electrolyte was fabricated from a single polymer electrolyte film and played the role of electrolyte and separator. However, such existing polymer electrolyte had difficulty in realizing a battery that operates stably and simultaneously on the positive electrode in a high voltage region and on the negative electrode in a low voltage region. Additionally, with a single polymer electrolyte alone, there arise a problem that the interface resistance between the electrode and the electrolyte increases due to the absence of the adhesion force. However, as shown in FIG. 1, this problem is solved by implementing a polymer electrolyte using a multi-layer structure.

According to the prior art (*J. Am. Chem. Soc.* 2016, 138, 9385-9388), the voltage profile in an electrolyte with a multi-layer structure composed of polymers and ceramics is close to 0V on the negative electrode side and exhibit high voltages on the positive electrode side. The solid electrolytes having this multi-layer structure are mostly composed of a combination of polymer and ceramic. However, there was no example of an all-solid-state battery implemented by combining two or more polymer electrolytes in accordance with their application and characteristics.

The present invention proposes a polymer solid electrolyte having a multi-layer structure and an all solid-state battery including the same, wherein the polymer electrolyte, which is in contact with the positive electrode, shows stable performance characteristics without decomposing in the high voltage region unlike the liquid electrolyte and exhibits a voltage stability in the negative electrode without causing reduction and decomposition in a low voltage region close to 0V. Particularly, the polymer electrolyte of the present invention has a multi-layer structure and has an advantage that the operating voltage in each layer can be controlled by varying the composition of each layer.

First Polymer Electrolyte Layer

The first polymer electrolyte layer 130 of the present invention includes an aliphatic dinitrile compound represented by the following Formula 1, a lithium salt, and a lithium ion conductive polymer:

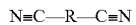 [Formula 1]

wherein R is $(CH_2)_n$ and n is an integer of 1 to 6.

When the aliphatic dinitrile compound is contained, since the polymer electrolyte has a high ion conductivity at room temperature of $10^{-4}$ S/cm or more and the electrolyte is not oxidized on the electrode surface in the positive electrode of the region having a high voltage of 4V or more as compared with the liquid electrolyte, thus the electrolyte can exhibit stable performance and effects as compared with the case where the aliphatic dinitrile compound is not contained.

Since among the aliphatic dinitrile compounds, compounds with long chains do not have a significant effect on the performance and safety of all solid-state batteries or rather cause adverse effects on the battery performance, the compounds (N≡C—R—C≡N, n=1 to 6) which have 1 to 6 carbons in the aliphatic hydrocarbon including succinonitrile are preferable. Of these, it is more preferable to select a nitrile having a small number of carbon atoms, and succinonitrile is most preferable.

Meanwhile, among the compounds containing cyano functional groups, aromatic nitrile and fluorinated aromatic nitrile compounds are easily decomposed electrochemically within the all solid-state battery to interfere with the migration of Li ions and deteriorate the battery performance, and thus they are undesirable.

The first polymer electrolyte layer 130 is prepared by selecting from a range of 20 to 50 parts by weight of an aliphatic dinitrile compound based on 100 parts by weight of the lithium ion conductive polymer. If the content of the aliphatic dinitrile compounds exceeds 50 parts by weight, the ion conductivity is reduced, and if the content is less than 20 parts by weight, the effect by the aliphatic dinitrile compound is insignificant. Therefore, it is properly adjusted within the above range. Preferably, if the content of the aliphatic dinitrile compound is 35 to 45 parts by weight, the stability for oxidation and ion conductivity in the high voltage positive electrode can be significantly increased.

Accordingly, the first polymer electrolyte layer may have an ion conductivity of $5\times10^{-5}$ S/cm to $5\times10^{-4}$ S/cm.

The lithium ion conductive polymer for the first polymer electrolyte layer 130 may be any one selected from the group consisting of polyethylene glycol diacrylate (PEGDA), trimethylolpropane ethoxylate triacrylate (ETPTA), polyacrylonitrile (PAN), polypropylene oxide (PPO), polypropylene carbonate (PPC), polyacrylonitrile, polyvinyl alcohol (PVA), polymethyl methacrylate (PMMA), polyvinyl chloride (PVC), polyvinylidene fluoride (PVDF), polyester (PE), polyamide (PA), polyethylene (PE), polyethylene glycol (PEG), polystyrene (PS) and combinations thereof, and may preferably be acrylate-based polymer, and more preferably trimethylolpropane ethoxylate triacrylate (ETPTA).

The lithium salts, which are commonly applied to the first polymer electrolyte layer 130 and the second polymer electrolyte layer 150 according to the present invention, can be dissociated as lithium ions to penetrate into the inside of the first polymer electrolyte layer 130 and the second polymer electrolyte layer 150 and then move freely therein. In this case, these lithium salts are the source of lithium ions and allow the basic operation of the lithium battery. These lithium salts can be used as long as they are commonly used in the lithium battery, and may be preferably any one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiSCN, LiC(CF$_3$SO$_2$)$_3$, (CF$_3$SO$_2$)$_2$NLi, (CF$_3$SO$_2$)$_2$NLi, (FSO$_2$)$_2$NLi, lithium chloroborane, lower aliphatic carboxylic acid lithium, lithium 4-phenylborate, imide and combinations thereof, and more preferably may be LiTFSI (Lithium bis(trifluoromethanesulfonyl)imide) represented by (CF$_3$SO$_2$)$_2$NLi.

In the first polymer electrolyte layer 130, the lithium salt is selected within the range of 30 to 40 parts by weight based on 100 parts by weight of the lithium ion conductive polymer.

Second Polymer Electrolyte Layer

The second polymer electrolyte layer 150 includes an ionic liquid, a lithium salt, and a lithium ion conductive polymer.

The ionic liquid is ionic salts (or molten salts) composed of cation and anion. Ionic compounds, such as sodium chloride, composed of cation and non-metallic anion, refer to ionic liquid that is ionic salt present in liquid at temperatures of 100° C. or less unlike that melting at a high temperature of 800° C. or more. In particular, the ionic liquid present in a liquid state at room temperature is referred to as a room temperature ionic liquid (RTIL).

The ionic liquid is nonvolatile, non-toxic, non-flammable, as compared to the conventional liquid electrolyte and has an excellent thermal stability and ion conductivity. In addition, since the ionic liquid has a unique characteristic that it dissolves inorganic and organic metal compounds due to its large polarity and exists as a liquid in a wide temperature range, the ionic liquid is used in a wide range of chemical fields such as catalyst, separation, and electrochemistry, by utilizing the advantage of the ability to obtain various properties by changing the structure of anion and cation constituting the ionic liquid.

Since the polymer electrolyte having the multi-layer structure for the all solid-state battery according to an embodiment of the present invention has such an ionic liquid, the stability of the battery is greatly improved in the negative electrode in the low voltage region. In addition, since the ionic liquid has excellent thermal stability and excellent ion conductivity, when the ionic liquid is added to the polymer electrolyte, the thermal stability can be improved without decreasing the ion conductivity. Since the ionic liquid has a large polarity and thus dissolves inorganic and organic metal compounds well and is present as a liquid in a wide temperature range, it can be added to the composition for forming a polymer electrolyte through simple mixing and heating.

The ionic liquid according to the present invention may include cation and anion, and the cation of the ionic liquid is preferably a cation of heterocyclic compound. The heteroatom of the heterocyclic compound can be selected from the group consisting of N, O, S, and combinations thereof. The cation of these heterocyclic compound may be a cation of the compounds selected from the group consisting of pyridinium, pyridazinium, pyrimidinium, pyrazinium, pyrazolium, thiazolium, oxazolium, triazolium, pyrrolidinium, piperidinium, imidazolium and combinations thereof.

The ionic liquid according to the present invention can be formed by a combination of cation and anion. The anion of the ionic liquid may be any anion of the compound selected from the group consisting of bis(perfluoroethylsulfonyl)imide, bis(trifluoromethylsulfonyl)imide, bis(fluorosulfonyl)imide, tris(trifluoromethylsulfonylmethide), trifluoromethanesulfonimide, trifluoromethylsulphoneimide, trifluoromethylsulfonate, tris(pentafluoroethyl)trifluorophosphate, bis(trifluoromethylsulfonyl)imide, tetrafluoroborate, hexafluorophosphate and combinations thereof.

The second polymer electrolyte layer 150 is prepared by selecting the ionic liquid within a range of 20 to 50 parts by weight based on 100 parts by weight of the lithium ion conductive polymer. If the content of the anionc liquid is less than 20 parts by weight, the effects of improvement of swelling and ion conductivity enhancement are not exhibited, and if the content exceeds 50 parts by weight, the phenomena of destruction of negative electrode and reduction of ion conductivity are occurred. Preferably, if the content of the ionic liquid is 35 to 45 parts by weight, the stability for reduction and decomposition and ion conductivity of the electrolyte at the negative electrode in the low voltage region can be significantly increased.

Accordingly, the second polymer electrolyte layer may have an ion conductivity of $1 \times 10^{-6}$ S/cm to $1 \times 10^{-4}$ S/cm.

The lithium ion conductive polymer for the second polymer electrolyte layer 150 may be of the same or different material as that of the first polymer electrolyte layer 130, preferably the same one in view of process convenience.

The lithium salts, which are commonly applied to the first polymer electrolyte layer 130 and the second polymer electrolyte layer 150 according to the present invention, can be dissociated as lithium ions to penetrate into the insides of the first polymer electrolyte layer 130 and the second polymer electrolyte layer 150 and then move freely therein. In this case, these lithium salts are the source of lithium ions and allow the basic operation of the lithium battery. These lithium salts can be used as long as they are commonly used in the lithium battery, by may preferably be any one selected from the group consisting of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, $(CF_3SO_2)_2NLi$, $(FSO_2)_2NLi$, lithium chloroborane, lower aliphatic carboxylic acid lithium, lithium 4-phenylborate, imide and combinations thereof, and more preferably may be LiTFSI (Lithium bis(trifluoromethanesulfonyl)imide) represented by $(CF_3SO_2)_2NLi$.

In the case of the second polymer electrolyte layer 150, the lithium salt is selected within the range of 30 to 40 parts by weight based on 100 parts by weight of the lithium ion conductive polymer.

At least one of the first polymer electrolyte layer 130 and the second polymer electrolyte layer 150 according to the present invention may include additives which are commonly used in the polymer solid electrolyte field. As an example, the additive may be at least one selected from the group consisting of an inorganic filler, an organic filler, and a polymer filler, and may be preferably the inorganic filler.

In the case of the inorganic filler, it is intended to prevent electrical shorting due to the impact and compression in the electrolyte from the inside/outside of the battery and form aggregates with the lithium ion conductive polymers to improve the heat shrinkage characteristics at high temperature. In this case, the inorganic filler used has the function of not causing chemical changes and is not particularly limited in its material, and may be any one selected from the group consisting of $TiO_2$, $BaTiO_3$, $Li_2O$, $LiF$, $LiOH$, $Li_3N$, $BaO$, $Na_2O$, $MgO$, $Li_2CO_3$, $LiAlO_2$, $SiO_2$, $Al_2O_3$, PTFE and mixtures thereof. The content of the inorganic filler in the first polymer electrolyte layer 130 and the second polymer electrolyte layer 150 respectively is preferably 5 wt. % to 10 wt. %. The particle size of the inorganic filler is preferably 0.01 μm~0.8 μm. In the case of the inorganic filler, a porous filler is preferred in order to sufficiently secure a path, through which ions are transferred, and to improve the ease of transport of lithium ions in the electrolyte layer.

Thickness of Polymer Electrolyte Layer

The first polymer electrolyte layer 130 and the second polymer electrolyte layer 150 described above need to be limited in their thicknesses in consideration of their functions as an electrolyte.

The thickness of the final polymer electrolyte layer 190, including the first polymer electrolyte layer 130 and the second polymer electrolyte layer 150, may be between 50 μm and 250 μm. If the thickness exceeds 250 μm, the resistance in the electrolyte layer increases and the advantage of the rate capability may be lost, and if the thickness is less than 50 μm, there may be a problem of limitation in the role of supporting the mechanical properties of the electrolyte. At this time, the thickness of each polymer electrolyte layer can be varied depending on the desired voltage range. The thickness of the first polymer electrolyte layer 130 may be between 25 μm and 225 μm and the thickness of the second polymer electrolyte layer 150 may be between 25 μm and 225 μm.

The first polymer electrolyte layer 130 and the second polymer electrolyte layer 150 may have a thickness ratio of 1:9 to 9:1. Since the present invention provides a multi-layer structure electrolyte for an all solid-state battery that exhibits stable performance on the positive electrode in a high voltage region of 4.0 V or more and on the negative electrode of the low voltage region of 1.5V or less, which contains the aliphatic dinitrile compound, there is an advantage that the thickness of the first polymer electrolyte layer 130 and the second polymer electrolyte layer 150 may be varied depending on the desired voltage range In the case of the polymer electrolyte containing the aliphatic dinitrile compound, the room temperature ion conductivity is high as $10^{-4}$ S/cm or more, and it operates stably even at the high voltage positive electrode of 4V or more, but due to the drawback of vulnerability in the low voltage stability, it is difficult to apply to the Li metal and graphite negative electrode and it can be used restrictively only to lithium titanate (LTO) negative electrode that has a high operating voltage at the 1.5V. Meanwhile, the polymer electrolyte based on polyethylene oxide (PEO) has good low voltage stability and can operate on the lithium negative electrode and graphite negative electrode, but on the contrary, it is difficult to apply to the high voltage positive electrode of 4V or more due to vulnerability in the high voltage stability. Therefore, in the case of the multi-layer structure electrolyte, it represents a stably applicable feature despite the voltage difference between the positive electrode and the negative electrode.

Preparing Method of Polymer Electrolyte Having Multi-Layer Structure

The polymer electrolyte of the multi-layer structure according to the present invention can be prepared by any method as long as it is a method capable of forming a film of a multi-layer structure.

First, the first coating solution including the aliphatic dinitrile compound represented by Formula 1, the lithium salt, and the lithium ion conductive polymer for the first polymer electrolyte layer 130 is prepared. At this time, the solvent may be acetonitrile, propionitrile, methoxypropionitrile or glutaronitrile, and acetonitrile may be preferably used. In addition, if the viscosity is secured and the lithium salt can dissociate without solvent, it is also possible to exclude the solvent.

The viscosity of the coating solution is 100 cp or less at 25° C., which may vary depending on the coating equipment and coating method. In addition, the coating thickness to be finally coated can be controlled by controlling the concentration or coating frequency of the coating solution.

The mixing of the first coating liquid is not particularly limited in the present invention, and a known mixing method can be used. For example, various coatings such as gravure coating, die coating, multi-die coating, dip coating and comma coating, or a combination thereof can be used. Preferably, a dip coating or a gravure coating is used to obtain a uniform coating surface.

Next, the first coating liquid is coated on a substrate and dried to prepare a coating film The substrate can be used without any particular limitation. For example, the substrate may be a transparent inorganic substrate such as quartz or glass, or may be any one transparent plastic substrate selected from the group consisting of polyethyleneterephthalate (PET), polyethylene naphthalate (PEN), polycarbonate (PC), polystyrene (PS), polypropylene (PP), polyimide (PI), polyethylene sulfonate (PES), polyoxymethylene (POM), polyetheretherketone (PEEK), polyethersulfone (PES) and polyether imide (PEI).

The substrate is coated with the first coating solution, dried at room temperature for 24 hours, and dried at 40° C. under vacuum to produce a film.

The drying process is a process for removing the solvent and moisture in the coating solution to dry the coating solution coated on the substrate and may be changed depending on the solvent used. Examples of the drying method may include a drying method by warm air, hot air, low-humidity air, vacuum drying, and irradiation with (far)-infrared radiation or electron beam. The drying time is not particularly limited but is usually in the range of 30 seconds to 24 hours. After the drying step, a cooling process of slowly cooling to room temperature may be further included.

In addition, when a solvent is not contained, the film can be prepared using ultraviolet light in the form of a photo-curing reaction.

A photo-initiator can be used in the photo-curing reaction. The photo-initiator can be used without limitation of its composition as long as it is a compound capable of forming radicals by light such as ultraviolet light. Examples of the photopolymerization initiator may be any one selected from the group consisting of 2-hydroxy-2-methyl-1-phenylpropan-1-one (HMPP), benzoin ether, dialkyl acetophenone, hydroxyl alkylketone, phenyl glyoxylate, benzyl dimethyl ketal, acyl phosphine and α-aminoketone. Meanwhile, a specific example of acyl phosphine may be commercially available lucirin TPO, i.e., 2,4,6-trimethyl-benzoyl-trimethyl phosphine oxide, and preferably 2-hydroxy-2-methyl-1-phenyl-propan-1-one (HMPP) can be used.

Next, the second coating solution for the second polymer electrolyte layer is prepared by using acetonitrile as solvent while adding the ionic liquid, the lithium salt and the lithium ion conductive polymer. Teflon film is coated with the second coating solution, dried at room temperature for 24 hours, and then dried at 40° C. under vacuum to produce a film.

Next, the polymer electrolyte 190 of the present invention is prepared by laminating the first polymer electrolyte layer 130 and the second polymer electrolyte layer 150. The first polymer electrolyte layer 130 and the second polymer electrolyte layer 150 are integrated by a roll lamination pressing process as a laminating method.

The pressing may be performed by cold-pressing or hot-pressing. In particular, the cold-pressing has a process advantage in that no special heat treatment is required. Specifically, the pressing may be a hot-pressing process as disclosed in Korean Patent Publication No. 10-2016-0013631, which may affect the ion conductivity and the improvement of the contact area between particles (J. Am. Ceram Soc. 94 [6]1779-1783 (2011)), and therefore, an electrolyte having a multi-layer structure with improved performance in terms of rate capability can be manufactured.

Further, the pressing may be performed at a pressure of 50 to 1000 MPa. when the pressure is less than 50 MPa, there arises a problem that the first polymer electrolyte layer 130 and the second polymer electrolyte layer 150 cannot be achieved, and the pressure is limited to the above range.

All Solid-State Battery

In the all solid-state battery 100 and 200 proposed in the present invention, the structure of the solid electrolyte is limited as described above, and the other components constituting the battery, that is, the positive electrodes 110 and 210 and the negative electrodes 170 and 250 are not particularly limited in the present invention but are as described below.

The negative electrodes 170 and 250 of all solid-state batteries 100 and 200 are made of lithium metal alone or are prepared by laminating a negative electrode active material on a negative electrode current collector.

At this time, the negative electrode active material may be one selected from the group consisting of lithium metal, lithium alloy, lithium metal composite oxide, lithium-containing titanium composite oxide (LTO) and combinations thereof. At this time, the lithium alloy may be an alloy of lithium and at least one metal selected from the group consisting of Na, K, Rb, Cs, Fr, Be, Mg, Ca, Sr, Ba, Ra, Al and Sn. In addition, the lithium metal composite oxide may be composed of lithium and oxide ($MeO_x$) of any one metal (Me) selected from the group consisting of Si, Sn, Zn, Mg, Cd, Ce, Ni and Fe, and for example, may be $LixFe_2O_3$ ($0<x\leq1$) or $LixWO_2$ ($0<x\leq1$).

In addition, the negative electrode active material may be metal composite oxides such as $Sn_xMe_{1-x}Me'_yO_z$ (Me:Mn, Fe, Pb, Ge; Me':Al, B, P, Si, elements of groups I, II, and III of the Periodic Table, halogens; $0<x\leq1$; $1\leq y\leq3$; $1\leq z\leq8$); metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO2_2$, $Bi_2O_3$, $Bi_2O_4$ and $Bi_2O_5$. Carbon-based negative electrode active materials such as crystalline carbon, amorphous carbon, or carbon composite can be used alone or in combination of two or more.

In addition, the negative electrode current collector is not particularly limited as long as it has electrical conductivity without causing chemical changes in all solid-state batteries 100 and 200, and may be, for example, made of copper, stainless steel, aluminum, nickel, titanium, baked carbon, copper, or stainless steel surface-treated with carbon, nickel, titanium or silver, an aluminum-cadmium alloy, etc.

In addition, similar to the positive electrode current collector, the negative electrode current collector may also be prepared in various forms such as films having fine irregularities at a surface thereof, sheets, foils, nets, porous structures, foams, and non-woven fabrics.

The positive electrode of the all solid-state battery according to the present invention is not particularly limited and may be a material used in a known all solid-state battery.

If the electrode is a positive electrode, the electrode is a positive electrode current collector, and if the electrode is a negative electrode, the electrode is a negative electrode current collector.

The positive electrode current collector is not particularly limited as long as it has high electrical conductivity without causing chemical changes in the battery, and may be, for example, made of stainless steel, aluminum, nickel, titanium, baked carbon or aluminum, or stainless steel surface-treated with carbon, nickel, titanium or silver, etc.

The positive electrode active material may vary depending on the application of the lithium secondary battery. The positive electrode active material may be lithium transition metal oxides such as $LiNi_{0.8-x}CO_{0.2}AlxO_2$, $LiCo_xMn_yO_2$, $LiNi_xCo_yO_2$, $LiNi_xMn_yO_2$, $LiNi_xCo_yMn_zO_2$, $LiCoO_2$, $LiNiO_2$, $LiMnO_2$, $LiFePO_4$, $LiCoPO_4$, $LiMnPO_4$ and $Li_4Ti_5O_{12}$; chalcogenides such as $Cu_2Mo_6S_8$, FeS, CoS and MiS, oxides, sulfides or halides of scandium, ruthenium, titanium, vanadium, molybdenum, chromium, manganese, iron, cobalt, nickel, copper, or zinc. More specifically, $TiS_2$, $ZrS_2$, $RuO_2$, $Co_3O_4$, $Mo_6S_8$, $V_2O_5$ and the like may be used as a positive electrode active material, but the present invention is not limited thereto.

The shape of the positive electrode active material is not particularly limited, and may be a particle shape, for example, a spherical shape, an elliptical shape, a rectangular parallelepiped shape, or the like. The average particle diameter of the positive electrode active material may be, but is not limited to, in the range of 1 to 50 μm. The average particle diameter of a positive electrode active material can be obtained, for example, by measuring the particle diameter of the active material observed by a scanning electron microscope and calculating the average value thereof.

The binder included in the positive electrode is not particularly limited, and fluorine-containing binders such as polyvinylidene fluoride (PVDF) and polytetrafluoroethylene (PTFE) can be used.

The content of the binder is not particularly limited as long as it can fix the positive electrode active material and may be in the range of 0 to 10 wt. % based on the total weight of the positive electrode.

A positive electrode may further contain a conductive material. The conductive material is not particularly limited as long as it can improve the electrical conductivity of the positive electrode, and examples thereof may include nickel powder, oxidized cobalt, titanium oxide, carbon and the like. Examples of the carbon may be any one selected from the group consisting of Ketjen black, acetylene black, furnace black, graphite, carbon fiber and fullerene, or combinations of two or more.

At this time, the content of the conductive material may be selected in consideration of other conditions of the battery such as the type of the conductive material, and can be, for example, in the range of 1 to 10 wt. %, based on the total weight of the positive electrode The fabrication of an all solid-state battery having the above configuration is not particularly limited in the present invention and can be fabricated by a known method.

As an example, the solid electrolyte is placed between the positive electrode and the negative electrode, and then the cell is assembled by its compression molding. The first polymer electrolyte layer of the polymer electrolyte can also be fabricated while placing it in contact with the positive electrode.

The assembled cell is placed in a casing and sealed by heat compression or the like. Laminate packs such as aluminum, stainless, etc., and cylindrical or square metal containers are very suitable for the exterior.

Hereinafter, the present invention will be described in detail with reference to a preferred example of the present invention and attached drawings. However, it will be apparent to those skilled in the art that the present invention is not limited by the following examples, and that various changes and modifications can be made within the technical scope of the present invention.

Example 1

For the preparation of the first polymer electrolyte layer, succinonitrile as an aliphatic dinitrile compound and LiTFSI were added in a mass ratio of 8:13 and heated and mixed for 3 hours at 60° C. Then, 21.5 wt. % and 0.5 wt. % of EMPTA (Trimethylolpropane ethoxylate triacrylate) as a lithium ion conductive polymer and HMPP (2-hydroxy-2-methyl-1-phenylpropan-1-one) as a photoinitiator respectively were added to prepare the mixed solution.

The mixed solution was cast on a transparent polyethylene terephthalate (PET) film, and then irradiated with ultraviolet light of 254~365 nm for 90 seconds to prepare the first polymer electrolyte layer film. The thickness of the first polymer electrolyte layer film was adjusted to 95 μm.

For the preparation of the second polymer electrolyte layer, the polymer mixture of PEO (Polyethylene Oxide) and PPC (Polypropylene Carbonate) in a mass ratio of 8:2 respectively was mixed with 32.4 wt. % of LiTFSI as a lithium salt, and then 22.5 wt. % of [EMIM] [FSI] (1-Ethyl-3-methylimidazolium bis(fluorosulfonyl)imide) was additionally added, and 10 ml of acetonitrile was added thereto, followed by stirring for 24 hours.

The mixed solution was cast on a Teflon film, dried at room temperature for 24 hours, and further dried at 40° C. under vacuum to prepare a second polymer electrolyte layer film. The thickness of the second polymer electrolyte layer film was adjusted to 94 μm.

The first polymer electrolyte layer film and the second polymer electrolyte layer film obtained were laminated by roll lamination to obtain a polymer electrolyte layer film.

The film thickness was adjusted to 189 μm. The ion conductivity and the voltage stability of one prepared polymer solid electrolyte obtained were measured.

Example 2

Example 1 was repeated except that the thickness of the first polymer electrolyte layer was adjusted to 67 μm and the thickness of the second polymer electrolyte layer was adjusted to 65 μm, and thus the thickness of the polymer solid electrolyte was changed to 132 μm.

Comparative Example 1

Succinonitrile and LiTFSI were mixed in a mass ratio of 8:13 and heated mixed at 60° C. for 3 hours, Then, a mixed solution was prepared by further addition of 21.5 wt. % and 0.5 wt. % of ETPTA (Trimethylolpropane ethoxylate triacrylate) as a lithium ion conductive polymer and HMPP (2-hydroxy-2-methyl-1-phenylpropan-1-one) as a photoinitiator respectively.

The mixed solution was cast on a transparent polyethylene terephthalate (PET) film as a substrate, and then irradiated with ultraviolet light of 254~365 nm for 90 seconds to prepare the first polymer electrolyte layer film. The thickness of the first polymer electrolyte layer film was adjusted to 182 μm. The ion conductivity and the voltage stability of the prepared polymer solid electrolyte were measured.

Comparative Example 2

A polymer mixture of PEO (Polyethylene Oxide) and PPC (Polypropylene Carbonate) in a mass ratio of 8:2 was mixed with 32.4 wt. % LiTFSI as a lithium salt, and then 22.5 wt. % of [EMIM] [FSI] ionic liquid was further added, and 10 mL of acetonitrile was added thereto, followed by stirring for 24 hours.

The mixed solution was cast on a Teflon film, dried at room temperature for 24 hours, and further dried at 40° C. under vacuum to prepare a film. The thickness of the film was adjusted to 195 μm. The ion conductivity and the voltage stability of the prepared polymer solid electrolyte were measured.

Measurement of Ion Conductivity

The ion conductivity of the polymer solid electrolyte prepared in Examples 1 and 2 and Comparative Examples 1 and 2 was measured using the following Equation 1 after measuring their impedance.

A film sample of the polymer solid electrolyte having a certain width and thickness was prepared for the measurement. A SUS substrate having excellent electron conductivity as an ion blocking electrode was brought into contact with both sides of the plate-shaped sample, and then an AC voltage was applied through the electrodes on both sides of the sample. At this time, the measurement frequency as the applied condition was set to the amplitude range of 1.0 MHz to 0.1 Hz, and the impedance was measured using BioLogic company VMP3. The resistance of the bulk electrolyte was determined from the intersection (Rb) where the semicircle or straight line of the trajectory of the measured impedance meets the real-number axis. The ion conductivity of the polymer solid electrolyte membrane was calculated from the width and thickness of the sample.

$$\sigma(S \cdot cm^{-1}) = \frac{1}{R_b} \frac{t}{A}$$ [Equation 1]

σ: Ion conductivity
$R_b$: Intersection of the trajectory of the measured impedance with the real-number axis
A: Width of the sample
t: Thickness of the sample The multi-layer polymer electrolyte film of Example 1 showed an ion conductivity of 2.14±0.97×10⁻⁴ S/cm.
The multi-layer polymer electrolyte film of Example 2 showed an ion conductivity of 2.13±0.97×10⁻⁴ S/cm.
The first polymer electrolyte film of Comparative Example 1 showed an ion conductivity of 1.77±0.26×10⁻⁴ S/cm.
The second polymer electrolyte film of Comparative Example 2 showed an ion conductivity of 4.01±0.95×10⁻⁶ S/cm.

As a result of the measurement of the ion conductivity, it was confirmed that the multi-layer solid polymer electrolyte of the Example according to the present invention shows an excellent average ion conductivity as compared with the electrolyte of Comparative Example.

Measurement of Voltage Stability

The voltage stability of the polymer solid electrolytes prepared in Examples 1 to 2 and Comparative Examples 1 to 2 was evaluated using a linear sweep voltammetry (LSV), and BioLogic company VMP3 was used. One side of each of the polymer electrolytes in the Examples and Comparative Examples was brought into contact with a lithium metal electrode and the other side was brought into contact with a SUS substrate, thereby forming a coin cell. The voltage stability was measured in the range of −1 V to 6 V with a scanning speed of 10 mV/s As shown in FIG. 4, the polymer electrolyte film, which was fabricated into a multi-layer form using two films, showed stable characteristics at voltage from 0.5V to 5V. On the other hand, as shown in FIG. 5, the electrolyte layer of Comparative Example 1 was stable at 5V or more but was unstable in a low voltage region of 1.5V or less. Also, as shown in FIG. 6, in the case of Comparative Example 2, it was stable in the low voltage range of 1.5V or less, but it was unstable at 3.8V or more.

DESCRIPTION OF SYMBOLS 100, 200: All solid-state battery 110, 210: Positive electrode
190, 230: Solid electrolyte 170, 250: Negative electrode
130: First polymer electrolyte layer
150: Second polymer electrolyte layer The polymer electrolyte having the multi-layer structure according to the present invention can be used stably on the positive electrode in the high voltage region and on the negative electrode in the low voltage region, and an all solid-state battery including the same are available as a high capacity and high-power battery in a variety of technical fields.

The invention claimed is:

1. A polymer electrolyte having a multi-layer structure for all solid-state batteries, which comprises:
   a first polymer electrolyte layer comprising an aliphatic dinitrile compound represented by the following Formula 1, a first lithium salt and a first lithium ion conductive polymer; and
   a second polymer electrolyte layer comprising an ionic liquid, a second lithium salt and a second lithium ion conductive polymer:

N≡C—R—C≡N     [Formula 1]

wherein R is $(CH_2)_n$ and n is an integer of 1 to 6;
   wherein the first polymer electrolyte layer and the second polymer electrolyte layer do not contain a solvent other than the ionic liquid; and
   wherein the polymer electrolyte having a multi-layer structure is suitable for use in an all solid-state battery.

2. The polymer electrolyte having the multi-layer structure for the all solid-state batteries according to claim 1, wherein the aliphatic dinitrile compound is succinonitrile.

3. The polymer electrolyte having the multi-layer structure for the all solid-state batteries according to claim 1, wherein the ionic liquid includes cation and anion, and the cation is a cation of a heterocyclic compound.

4. The polymer electrolyte having the multi-layer structure for the all solid-state batteries according to claim 3, wherein the cation of the heterocyclic compound is a cation of a compound selected from the group consisting of pyridinium, pyridazinium, pyrimidinium, pyrazinium, pyrazolium, thiazolium, oxazolium, triazolium, pyrrolidinium, piperidinium, imidazolium and combinations thereof.

5. The polymer electrolyte having the multi-layer structure for the all solid-state batteries according to claim 3, wherein the ionic liquid includes cation and anion, and the anion is an anion of the component selected from the group consisting of bis(perfluoroethyl sulfonyl)imide, bis(trifluoromethyl sulfonyl)imide, bis(fluorosulfonyl)imide, tris(trifluoromethylsulfonylmethide), trifluoromethanesulfonimide, trifluoromethylsulphoneimide, trifluoromethylsulfonate, tris(pentafluoroethyl)trifluoro phosphate, bis(trifluoromethylsulfonyl)imide, tetrafluoroborate, hexafluorophosphate and combinations thereof.

6. The polymer electrolyte having the multi-layer structure for the all solid-state batteries according to claim 1, wherein the first polymer electrolyte layer comprises 20 to 50 parts by weight of the aliphatic dinitrile compound and 30 to 40 parts by weight of the first lithium salt based on 100 parts by weight of the first lithium ion conductive polymer.

7. The polymer electrolyte having the multi-layer structure for the all solid-state batteries according to claim 1, wherein the second polymer electrolyte layer comprises 20 to 50 parts by weight of the ionic liquid and 30 to 40 parts by weight of the second lithium salt based on 100 parts by weight of the second lithium ion conductive polymer.

8. The polymer electrolyte having the multi-layer structure for the all solid-state batteries according to claim 1, wherein the first and second lithium salt is independently at least one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3S_{02})_3$, $(CF_3S_{02})_2NLi$, $(FSO_2)_2NLi$, lithium chloroborane, lower aliphatic carboxylic acid lithium, 4-phenyl lithium borate and lithium imide.

9. The polymer electrolyte having the multi-layer structure for the all solid-state batteries according to claim 1, wherein the first and second lithium ion conductive polymer is independently at least one selected from the group consisting of polyethyleneglycol diacrylate, trimethylolpropane ethoxylate triacrylate, polypropylene oxide, polypropylene carbonate, polyacrylonitrile, polyvinyl alcohol, polymethylmethacrylate, polyvinyl chloride, polyvinylidene fluoride, polyester, polyamide, polyethylene, polystyrene, and polyethylene glycol.

10. The polymer electrolyte having the multi-layer structure for the all solid-state batteries according to claim 1, wherein the first polymer electrolyte layer has an ion conductivity of $5\times10^{-5}$ to $5\times10^{-4}$ S/cm, and the second polymer electrolyte layer has an ion conductivity of $1\times10^{-6}$ to $1\times10^{-4}$ S/cm.

11. The polymer electrolyte having the multi-layer structure for the all solid-state batteries according to claim 1, wherein the first polymer electrolyte layer and the second polymer electrolyte layer each have a thickness of 25 μm to 225 μm.

12. The polymer electrolyte having the multi-layer structure for the all solid-state batteries according to claim 1, wherein the first polymer electrolyte layer and the second polymer electrolyte layer have a thickness ratio of 1:9 to 9:1.

13. The polymer electrolyte having the multi-layer structure for the all solid-state batteries according to claim 1, wherein the multi-layer polymer electrolyte has a thickness of 50 μm to 250 μm.

14. The polymer electrolyte having the multi-layer structure for the all solid-state batteries according to claim 1, wherein at least one of the first polymer electrolyte layer and the second polymer electrolyte layer is at least one selected from the group consisting of an inorganic filler, an organic filler and a polymer filler.

15. An all solid-state battery comprising a positive electrode, a negative electrode, and a polymer electrolyte layer interposed therebetween, wherein the polymer electrolyte is the polymer electrolyte having the multi-layer structure according to claim 1.

16. The all solid-state battery according to 15, wherein the all solid-state battery is arranged such that the first polymer electrolyte layer of the polymer electrolyte having the multi-layer structure contacts the positive electrode.

\* \* \* \* \*